United States Patent [19]
Sale et al.

[11] 3,913,419
[45] Oct. 21, 1975

[54] TORQUE LIMITING SYSTEM AND METHOD

[75] Inventors: Dwight B. Sale, Burlingame; Terry R. Koelzer, San Bruno, both of Calif.

[73] Assignee: Guy F. Atkinson Company, San Francisco, Calif.

[22] Filed: Nov. 1, 1972

[21] Appl. No.: 302,939

[52] U.S. Cl. .................................................. 74/857
[51] Int. Cl.² ............... B60K 41/04; F02D 31/00; G05G 23/02
[58] Field of Search .............. 74/857, 858, 859, 860

[56] References Cited
UNITED STATES PATENTS

| | | | |
|---|---|---|---|
| 1,868,130 | 7/1932 | Bayer et al. ........................ | 74/859 X |
| 2,089,590 | 8/1937 | Walti ................................ | 74/859 X |
| 2,337,910 | 12/1943 | Maybach ......................... | 74/859 X |
| 2,713,800 | 7/1955 | Forster.............................. | 74/857 |
| 2,732,048 | 1/1956 | Forster et al. .................... | 74/857 X |
| 2,753,733 | 7/1956 | Forster.............................. | 74/857 X |
| 2,771,788 | 11/1956 | Frick et al. ...................... | 74/860 |
| 2,909,078 | 10/1959 | Nallinger ......................... | 74/860 |
| 2,922,314 | 1/1960 | Johnson et al..................... | 74/857 |
| 2,981,122 | 4/1961 | Kelley............................... | 74/857 |
| 3,013,442 | 12/1961 | Fox et al........................... | 74/857 |
| 3,151,444 | 10/1964 | Jonkers et al..................... | 74/857 X |
| 3,620,103 | 11/1971 | Forster et al. .................... | 74/860 |

FOREIGN PATENTS OR APPLICATIONS

727,699   4/1955   United Kingdom................... 74/857

*Primary Examiner*—Samuel Scott
*Assistant Examiner*—Lance W. Chandler
*Attorney, Agent, or Firm*—Flehr, Hohbach, Test, Albritton & Herbert

[57] ABSTRACT

A torque limiting system for use in power driven equipment in which the power is applied through a torque converter to a drive train. The system utilizes a signal which is proportional to converter output shaft rotational speed. The signal acts upon an engine speed governor to limit the torque applied through the torque converter by limiting the engine speed to predetermined speeds when the converter output shaft is stopped or rotating at relatively low speeds. At high converter output shaft speeds the governor operates in its normal manner since excessive torque is not normally developed when this shaft is rotating above a predetermined speed. In a gear train having more than one gear ratio the system may contain means for limiting operation to certain gear ratios if it would interfere with performance in other gear ratios, or such means may be omitted rendering the system operative in all gears if no such interference would occur.

13 Claims, 6 Drawing Figures

TORQUE LIMITING SYSTEM AND METHOD

BACKGROUND OF THE INVENTION

The invention relates to a torque limiting system and more particularly to a system for protecting drive train components driven by an internal combustion engine through a torque converter.

The condition of highest torque on the drive train occurs with the transmission in lowest gear, the torque converter output shaft not moving, or stalled, and with the fuel flow ports to the engine, or "rack" in the case of a diesel engine, fully open. At this point torque at the output of the torque converter is often excessive and may damage the drive train components due to the high internal stresses imposed. In the case of a tractor and trailer for moving heavy loads it is possible to govern the engine to a lower than normal speed which will not deliver excessive torque to the drive train components when the vehicle is not moving, but as soon as the vehicle begins to move the torque drops off sharply to levels which do not provide acceptable performance or acceleration. This lower than normal governed speed also would not allow the vehicle to attain normal maximum road speed. There is a vehicle speed in first gear above which normal governed engine speeds will not impose excessive torque on the drive train components. The problem lies between the stalled or zero speed condition and the last named vehicle speed condition. Since the torque delivered to the drive train is a function of engine speed and speed of the vehicle over the ground in a given gear, the problem of excessive torque is normally limited to the lower end of the speed range attainable in first gear. Control of engine speed in this lower range of vehicle speeds in first gear provides control of torque converter output and thus stress imposed on the drive train components. A system is needed therefore which limits the stalled torque to an acceptable level, and which maintains an acceptable torque from stall speed to a speed at which normal governed speed of the engine results in acceptable torque levels. A further requirement in such a system is that it not interfere with normal vehicle operation in other gear ranges when damaging torque levels are not present.

SUMMARY OF THE INVENTION AND OBJECTS

A torque limiting system is provided for equipment having an internal combustion engine connected to a torque converter to drive a load through a drive train. The system includes means for deriving a signal which is proportional to converter output speed. When normal governed speed of the engine generates torque through the converter which may overstress the drive train components the signal is applied to a governor which controls the engine speed thus limiting torque. As the converter output shaft increases in speed, the signal allows engine speed to increase until the converter output shaft reaches a predetermined speed. Thereafter, the governor controls the engine speed in its conventional manner. The system may include means whereby the governor operates in a normal manner when the vehicle is operating in any gear other than first gear. The engine speed governor connected in the system can be adjusted to provide desired characteristics during the torque limiting mode.

In general, it is an object of the torque limiting system and method to provide protection for drive train components associated with high horse power internal combustion engines.

Another object of the torque limiting system and method is to remove control from the operator during operation in predetermined torque ranges.

Another object of the torque limiting system and method is to provide protection for drive train components whether the output from the torque converter is coupled into a stalled load increasing to an acceptable speed or is decreasing from an acceptable speed to a stalled condition.

Another object of the torque limiting system and method is to provide a relationship between torque converter output torque and torque converter output shaft rotational speed which is positive in slope for situations where for example a decrease to a predetermined minimum speed requires further decrease to zero speed to avoid damage to associated components or for other situations where such a relationship is advantageous.

Another object of the torque limiting system and method is to provide a relationship between the torque converter output torque and the torque converter output shaft rotational speed which has a negative slope for the situation where for example more torque is required as speed drops from a predetermined minimum to zero or for other situations where such a relationship is advantageous.

Another object of the torque limiting system and method is to provide a relationship between torque converter output torque and output shaft rotational speed which is constant in the range where for example maximum engine speeds could cause progressive damage to drive train components or for other situations where a constant torque relationship is advantageous.

Another object of the torque limiting system and method is to provide torque limiting without degrading the performance of the equipment upon which installed.

Additional objects and features of the torque limiting system and method will appear from the following description in which the preferred embodiment has been set forth in detail in conjunction with the accompanying drawings.

DESCRIPTION OF THE PREFERRED EMBODIMENT

Figure 1:
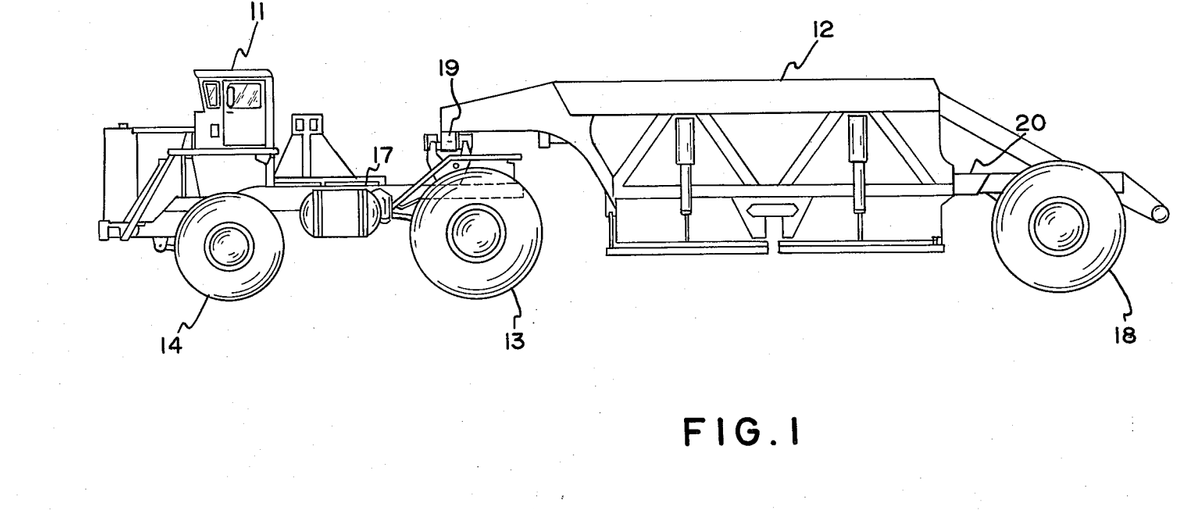
FIG. 1 is a side elevation of a tractor-trailer type vehicle for transporting heavy loads.

Equipment which is utilized to perform work on loads having high inertia and using an internal combustion engine as a prime mover must have some means for torque conversion to efficiently couple the power from the prime mover to the load. At stall speeds and speeds close to stall the prime mover may produce torques through the torque converter which are excessive considering the internal stress capabilities of the drive train components. One embodiment of the torque limiting system involves use with a tractor-trailer combination as seen in FIG. 1. A tractor 11 is designed to pull heavy loads which are carried in a trailer 12. The tractor is provided with drive wheels 13. A framework 17 for the tractor 11 is supported by front wheels 14. A framework 20 for the trailer 12 is supported by rear wheels 18 and pivot 19 located above the rear portion of the tractor 11.

Figure 2:
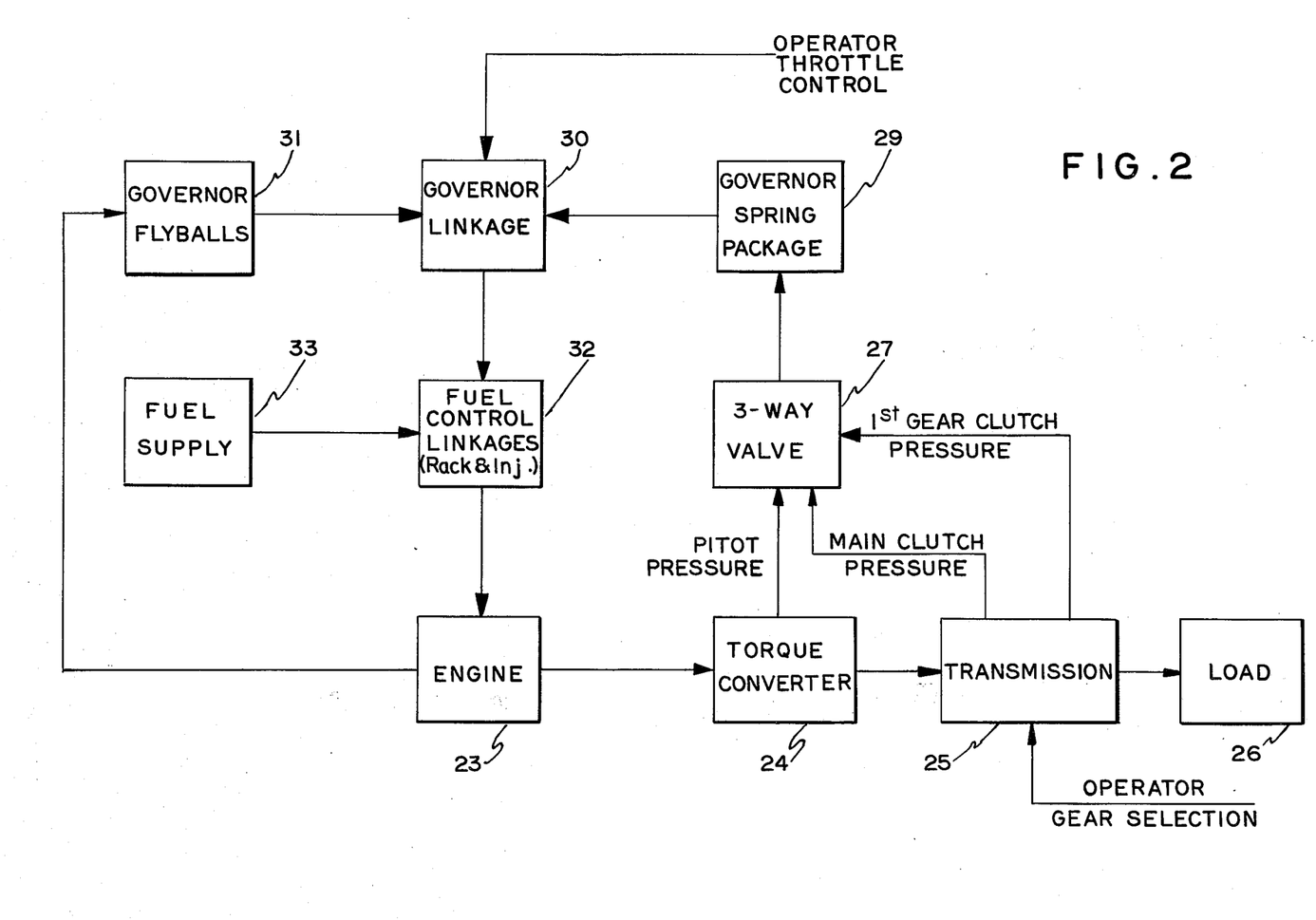
FIG. 2 is a block diagram showing the relationship between the major components in a system with separate switchover to normal governor operation.

A diesel engine 23 as seen in the block diagram of FIG. 2 is carried in the tractor 11. The engine 23 delivers power to a torque converter 24 which in turn drives a transmission 25. Torque, multiplied to provide acceptable operation is delivered from the torque converter 24 to the transmission 25 and then to a load 26. In the embodiment described here the load 26 is represented by inertial and drag forces resisting rotation at the rim of drive wheels 13.

Figure 3:
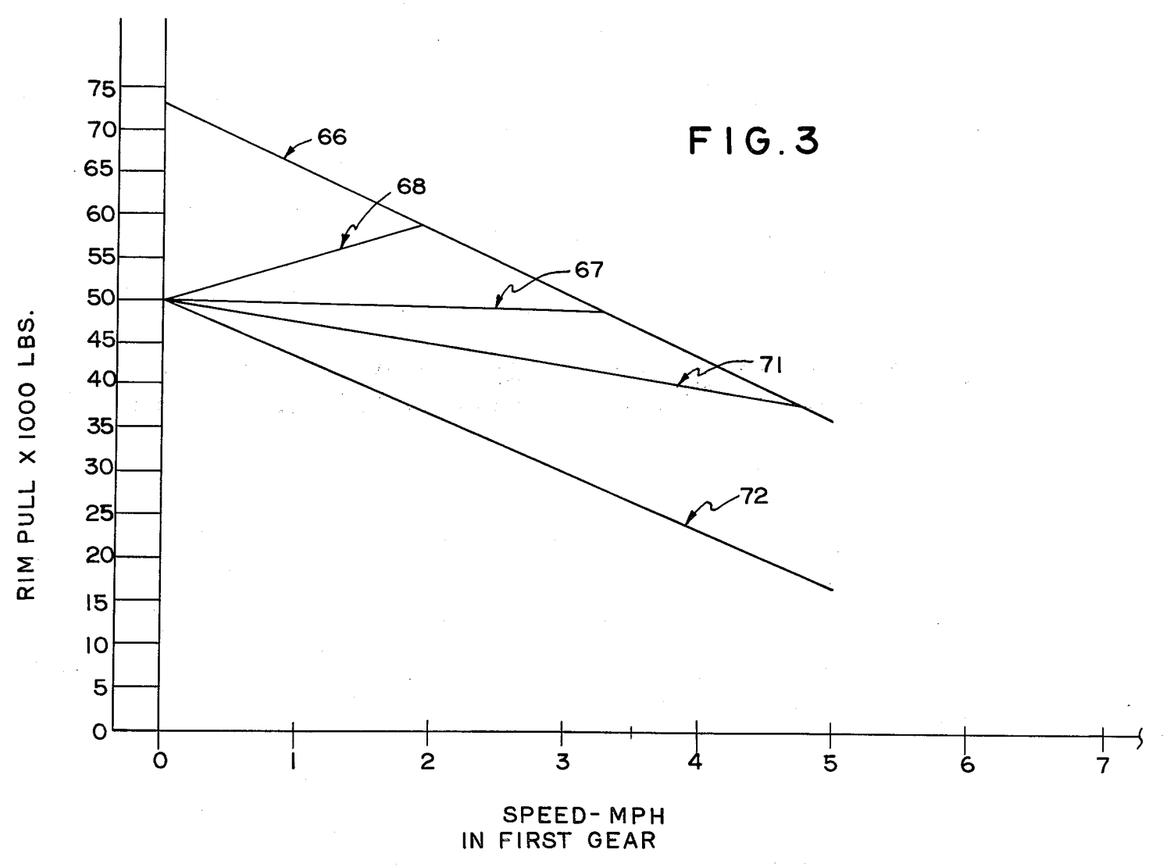
FIG. 3 is a chart of the relationship between the torque converter output torque and the speed over the ground in first gear of the tractor-trailer shown in FIG. 1.

The inertial and drag forces resisting rotation of drive wheels 13 are overcome by drive forces measured at the rolling radius of the drive wheels and provided through the power train, which forces are termed "rim pull." A chart of rim pull as a function of vehicle speed over the ground in miles per hour is seen in FIG. 3. The chart depicts rim pull as a function of speed in first gear only when the engine is pulling the vehicle. Rim pull is an expression of drive train torque and thus output from the torque converter 24. In this embodiment first gear selection by the vehicle operator provides a first gear clutch pressure to a pilot port of a three way pressure valve 27 as seen in FIG. 2. Three way valve 27 may be of the pilot operated type. Torque converter pitot pressure is continually supplied to the three way valve 27 at a first input port. Pitot pressure is a variable pressure which is directly proportional to converter output shaft speed. Main clutch pressure is continually delivered to a second input port at three way valve 27. Either pitot pressure as determined by selection of first gear or main clutch pressure as determined by selection of a gear other than first gear is directed to a governor spring package 29. Governor spring package 29 imparts a force to governor linkage 30. Governor flyballs 31 impart an opposing force to governor linkage 30 proportional to speed of the engine 23. The vehicle operator imparts motion to the fuel control linkages 32 through a differential lever in the governor linkage 30. The fuel control linkages 32 vary the fuel flow to the engine 23 from a fuel supply 33. The governor linkage 30 will cancel any motion imparted by the operator if the force from the governor flyballs 31 overcomes the force from the governor spring package 29 as hereinafter described. Therefore, the fuel delivered to the engine 23 is in proportion to the position of the operator throttle control until a preset engine speed is reached at which point the governor flyballs 31 and governor spring package 29 cooperate with the governor linkage 30 and the operator throttle control to reduce the fuel delivered to the engine by means of the fuel control linkages 32 so that the preset limiting speed of the engine is maintained.

*Versa TSP 8302.
*Trademark.

Figure 4:
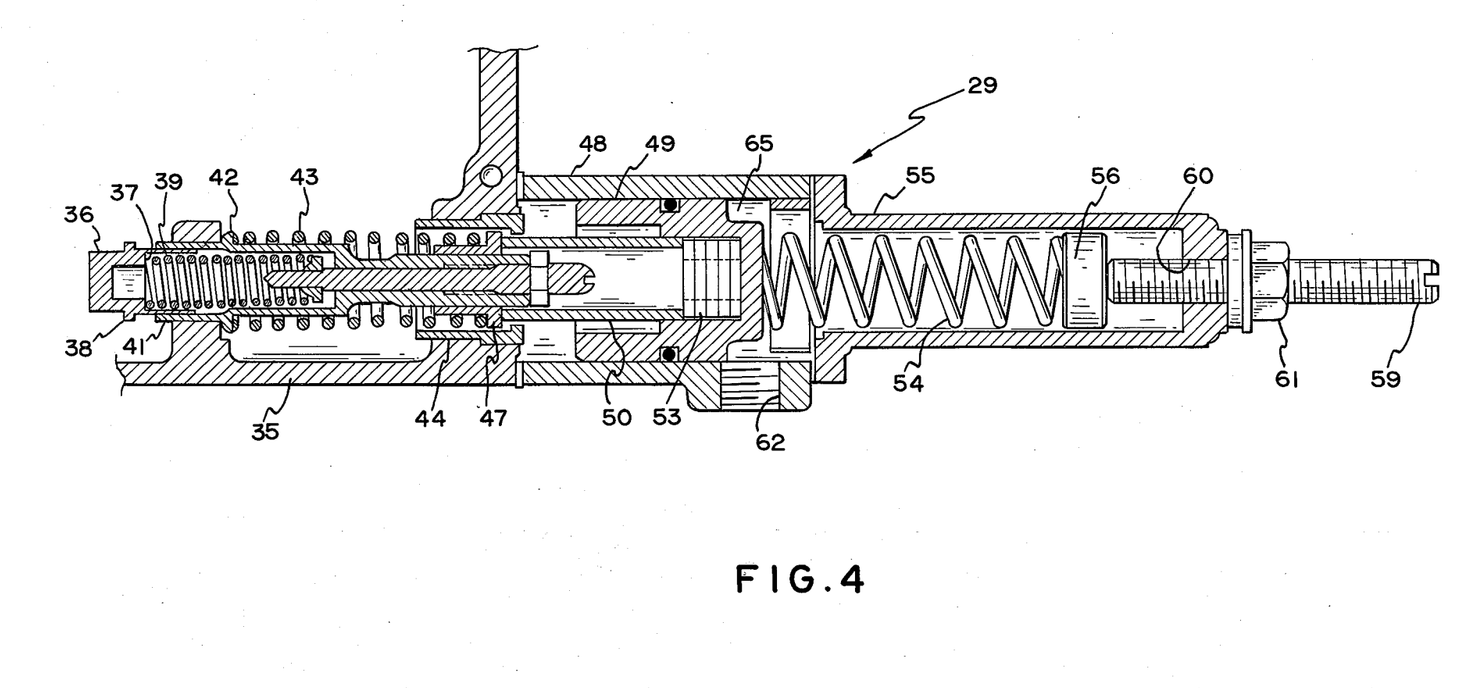
FIG. 4 is a sectional view of the modified governor for controlling fuel flow rates to an internal combustion engine.

The governor spring package 29 utilized in this embodiment is a modified spring package of a standard dual speed governor. It is mounted in a fitting 35 located on the engine 23 as seen in FIG. 4. A low speed spring cap 36 has an internal seat 37 for a low speed spring 39 and also has a shoulder 38 for contacting a high speed spring plunger 41. The high speed spring plunger 41 has a seat 42 for a high speed spring 43. A high speed spring guide 44 is located in the governor mounting fitting 35 and a high speed spring retainer 47 is contained therein for contacting the opposite end of the high speed spring 43. A governor housing 48 contains a movable piston 49 having a piston sleeve 50 in contact with the high speed spring retainer 47. Shims 53 are placed between the piston 49 and the piston sleeve 50 for adjustment of desired piston initial position. A bias spring 54 contacts the movable piston 49 on the side opposite from the high speed spring 43. A bias spring housing 55 is attached to the governor housing 48 and has an adjustable bias spring seat 56 for contacting the opposite end of bias spring 54. Adjustment of the compressed length of bias spring 54 is provided by threaded member 59 which contacts bias spring seat 56 and is threadably engaged in a threaded hole 60 in bias spring housing 55 and locked in place after adjustment by lock nut 61. A threaded port 62 is formed in the governor housing 48 and is in communication with a chamber 65 on the same side of the movable piston 49 as the bias spring 54. The threaded port 62 is for receiving a fitting (not shown) for delivery of pitot pressure or main clutch pressure as selected by three way valve 27.

Turning now to the operation of the system a description of the governor mechanism is undertaken for the purpose of distinguishing the standard and the improved features embodied therein. Governor spring package 29 is a modified spring package from a standard two speed limiting governor. Governor flyballs 31 operate in conjunction with governor linkage 30 to limit the available motion of fuel control linkage 32 thus restricting the fuel flow to the engine 23 and limiting the speed of the engine 23. The flyball forces limiting the motion of fuel control linkage 32 are opposed by forces generated in the governor spring package 29. Thus high spring compression forces or forces arising from introduction of pressure into chamber 65 will result in delimiting motion of fuel control linkage 32 resulting in higher attainable governed engine speeds.

Figure 6:
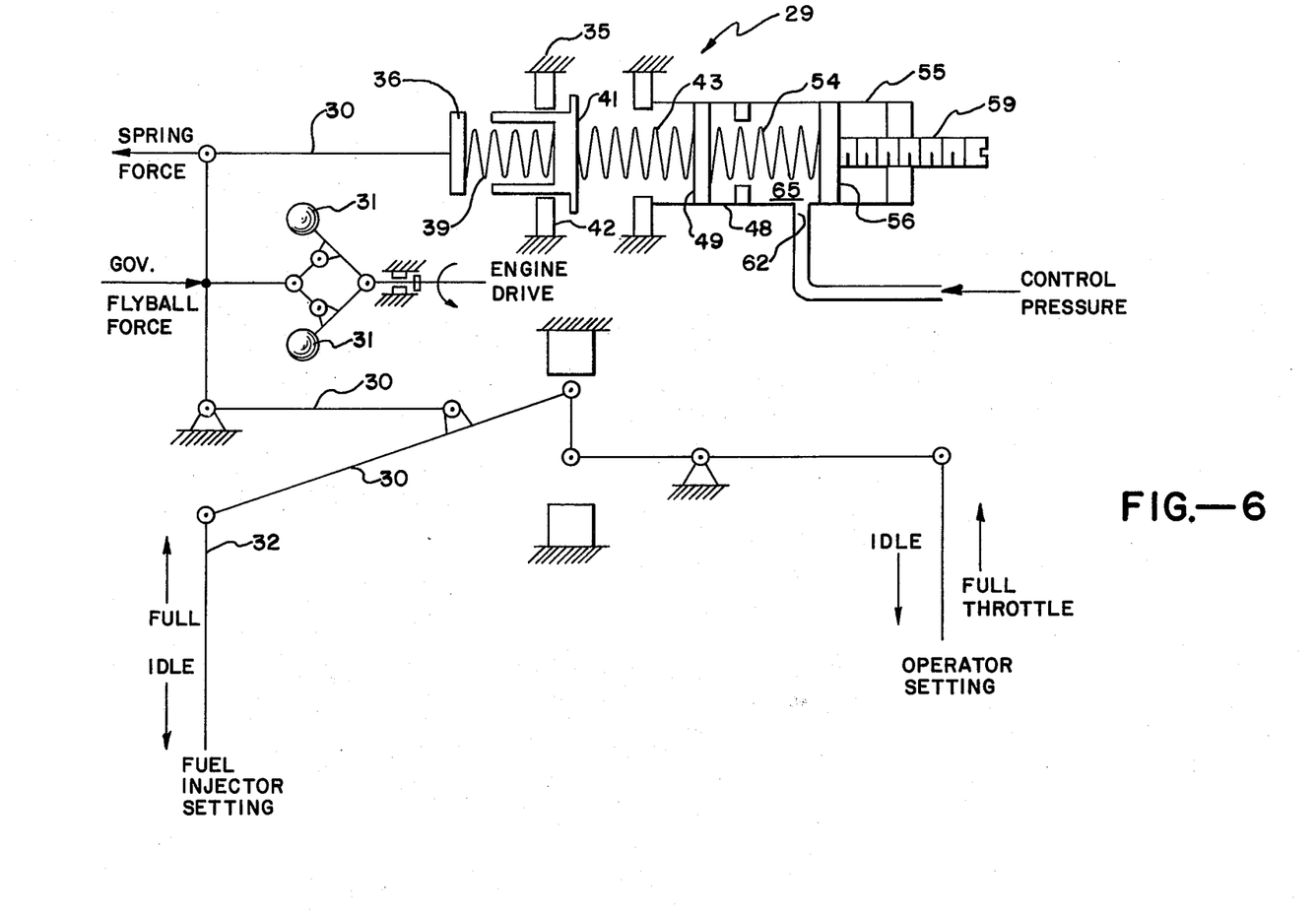
FIG. 6 is a mechanical schematic of the modified governor and the governor and fuel control linkage.

Referring to FIG. 6, the governor spring package 29, linkage 30 and fuel control linkage 32 is seen. A governor housing includes fitting 35 in which is positioned a compression spring made of low speed spring 39 and high speed spring 43. Flyballs 31 rotate at a speed proportional to engine speed and provide a force as indicated. Governor linkage 30 is provided between the flyballs 31 and the compression spring. Linkage 30 is urged by the governor flyball force toward a position which limits fuel flow to the engine as seen by the corresponding motion of fuel control linkage 32. The compression spring combination of springs 39 and 43 urges the linkage 30 in the opposite direction for delimiting engine fuel flow as seen by corresponding motion of linkage 32.

Bias spring 54 is mounted in housing 55 which is attached to one end of housing 48 mounted on fitting 35. Movable piston 49 translates within housing 48 which acts as a cylinder therefor. Piston 49 provides a movable seat for one end of bias spring 54 and bias spring seat 56 provides a fixed seat for the other end. The compression spring seats on the side of piston 49 opposite the movable seat. Control pressure is introduced to the bias spring side of piston 49 through port 62. Control pressure and compression spring force is transferred to linkage 30 through spring cap 36.

By reference to FIGS. 2 and 6 it may be seen that engine 23 powers torque converter 24 which provides torque to transmission 25. Three way valve 27 receives pitot pressure from torque converter 27 and first gear and main clutch pressures from transmission 25. When first gear is selected by the operator, first gear clutch pressure positions three way valve to provide torque converter pitot pressure to port 62. When first gear clutch pressure is removed by operator selection of another gear ratio, main clutch pressure, a constant high pressure, is directed to port 62.

In the above fashion either a variable or a constant high pressure is delivered to port 62. FIGS. 2 and 6 show that when governor flyball force overcomes spring force from spring package 29, which includes the control pressure, any motion of the linkage imparted by the operator to move fuel control linkage 32 will be cancelled by governor linkage 30.

The point of contact for transmission of spring package forces to the governor linkage 30 is the low speed spring cap 36 seen in FIG. 4. Spring cap 36 can be seen to contact low speed spring 39 which may be compressed until shoulder 38 contacts the end of high speed spring plunger 41. At this point further movement of low speed spring cap 36 is resisted by the higher spring generated forces of high speed spring 43. The conventional dual speed governor provides for introduction of a pressure into chamber 65 through port 62 which is high enough to move the piston 49 against the left stop further compressing high speed spring 43. This can be seen to impart higher spring forces opposing movement of the low speed spring cap 36 to the right. As discussed above higher governed engine speeds result. Removal of pressure from chamber 65 allows the movable piston 49 to seat against a right side stop (not shown) which provides a lower limiting speed at the engine 23. The modification to the dual range governor involves removal of the right side stop for piston 49 and addition of the bias spring housing 55, bias spring 54, bias spring seat 56, threaded adjustment member 59, and lock nut 61. These modification parts replace the usual end-cap (not shown) sealing the right end of chamber 65. In this manner the variable pitot pressure is directed through port 62 into chamber 65 providing infinitely variable positioning of movable piston 49 between the left and right stops. Thus continuously variable governed engine speed is provided for pitot pressures between zero and that sufficient to seat piston 49 against the left stop when three-way valve 27 directs pitot pressure to chamber 65 in spring package 29.

Bias spring 54 is adjusted in compressed length by turning threaded member 59 which urges bias spring seat 56 against the end of the bias spring 54. This affords an initial total spring pressure in the high speed range at low speed spring cap 36 which is the force exerted by the series combination of the high speed spring 43, and the bias spring 54, adjusted in compressed length by positioning of threaded member 59 and locked in position by lock nut 61.

When high loads are driven by internal combustion engines through a torque converter excessive torque levels may result in the drive train components in the low speed ranges or at start up. The drive train components in some instances may include a transmission such as that represented at 25 in FIGS. 2 and 5. Protection of the drive train components from the excessive torque levels is often necessary. Such a situation may exist in the operation of the tractor-trailer combination of FIG. 1. A fluid coupled torque converter is driven by a diesel engine. Maximum torque exists at the converter output when the engine is running at high speed and the torque converter output shaft is at zero speed. In such an instance it has been found that by limiting engine speeds to specified maximum values the torque at the converter output is held to an acceptable level. Since torque in the output shaft decreases as the output shaft begins to rotate, or as the vehicle begins to travel over the ground as it is driven through wheels 13 and as it is rolling on wheels 14 and 18, engine speed may be allowed to increase with vehicle speed while still maintaining acceptable torque levels in the drive train attached to the converter output. These speeds where excessive torques may exist for high engine speeds are found to lie at the lower end of the range of speeds attainable by the tractor 11 pulling the trailer 12 in first gear.

FIG. 3 is a graphical representation of torque converter output torque in first gear as a function of speed in miles per hour over the ground for a vehicle consisting of tractor 11 and trailer 12 shown in FIG. 1. Converter output torque is expressed in rim pull, which is the level of force made available at the rolling radius of drive wheels 13. For example an acceptable torque level in the drive train components at the output of the torque converter has been selected as equivalent to approximately 50,000 lbs of rim pull. Rim pull as a function of speed in miles per hour at full fuel flow to the engine is seen as the solid line 66 having a negative slope. For engine speeds which will provide 50,000 lbs maximum rim pull it can be seen from the chart of FIG. 3 that engine speed governing must be imposed up to a speed of approximately 3.5 miles per hour. Such a torque curve would appear as solid line 67 which intersects curve 66 at about the 3.5 mile per hour point on the abscissa and is seen to maintain a constant ordinate out to that point. A curve such as 67 may only be attained if high speed spring forces are increased at an appropriate rate as the vehicle gains ground speed. This increase in high speed spring forces is attained by introducing pressure rising in proportion to vehicle ground speed into chamber 65 of FIG. 4. In this embodiment the governor begins to limit engine speed at about 1400 RPM which provides approximately 50,000 lbs of rim pull at zero ground speed. To initiate vehicle motion the operator selects first gear at his control console. First gear clutch pressure is transmitted from the transmission 25 to the three-way valve 27. First gear clutch pressure positions valve 27 to pass pitot pressure from torque converter 24 through the valve 27 to the fitting contained in port 62 in spring package 29. Operator throttle control is limited by restrictions placed on movement of fuel control linkage 32 by the summation of forces generated by rotation of flyballs 31 and spring forces from spring package 29. As vehicle speed begins to increase pitot pressure increases, movable piston 49 moves to the left compressing high speed spring 43 as seen in FIG. 4 and the spring forces transmitted to the governor linkage 30 from spring package 29 are increased. This allows more rapid flyball rotation before limitation by the governor linkage 30 and consequent higher speeds from the engine 23. At about 3.5 miles per hour piston 49 is positioned so that flyball force and high speed spring force result in fuel control linkage 32 allowing full fuel flow to the engine 23 and as road speed increases full fuel flow is maintained. The rim pull relationship as a function of vehicle speed therefore assumes the negative slope of the right hand portion of curve 66 in FIG. 3.

When tractor 11 and trailer 12 have assumed a sufficient speed over the ground the operator may shift into the next higher gear ratio. Upon shifting out of first gear the first gear clutch pressure drops and lack of first gear pressure from transmission 25 positions the three-way valve 27 to pass main clutch pressure to the spring package 29. Main clutch pressure is sufficient to maintain movable piston 49 on its left stops affording a constant high speed limit for engine 23.

It is possible to shape the left hand portion of the rim pull versus vehicle speed curve. For example a bias spring 54 may be configured so as to assist movable piston 49 throughout the piston throw. If the spring rate is low enough so that the bias spring force is relatively constant throughout piston travel the combination bias spring and pressure forces on the movable piston 49 may be sufficient to move it to a position resulting in full fuel flow at some speed such as 2 miles per hour. In such a case if the rim pull at zero miles per hour were 50,000 lbs a line as labelled 68 would describe the relationship between rim pull and vehicle speed which intersects curve 66 at the 2 mile per hour point on the abscissa. This curve can be seen to have a positive slope to the point of intersection whereupon the relationship will follow the right portion of curve 66.

On the other hand a negative slope may be obtained if a bias spring 54 with a high spring rate is utilized so that the bias spring forces become greatly lessened as the movable piston 49 moves toward its left stop. In such a case a much higher pitot pressure will be called upon to move the piston 49 to a position resulting in full fuel flow. This may not occur until a speed of about 4.7 miles per hour for example occurs. Such a curve appears as curve 71 in FIG. 3 and can be seen to have a negative slope in the left hand portion prior to intersection with curve 66. It should be noted that merely restricting rim pull at zero miles per hour vehicle speed by governing the engine 23 at a constant speed in first gear will result in a drastic decrease in torque at the output of the torque converter 24 as the output shaft begins to rotate in proportion to vehicle speed. Torque available to drive the load decreases at an unacceptably fast rate for this type of a configuration and is not a useful solution to the problem. Such a curve may be seen as 72 in FIG. 3.

The torque limiting system must not limit the performance of the equipment upon which it is installed when the torque levels are below the level determined to be damaging to the drive train components. The three way valve 27 and its function as heretofore described is for the purpose of returning the spring package 29 to its normal mode of operation when the operator selects a higher gear than first gear. If the limiting torque is selected sufficiently high then the pitot pressure required to move piston 49 to a position resulting in full fuel flow is relatively low. The pitot pressure generated at the torque converter output for the normal operating range of any gear above first gear may well be higher than the pressure required to move piston 49 to a position resulting in full fuel flow. This gives rise to a condition where pitot pressure at any torque converter output speed in any of the gears above first gear is high enough to place the governor in a condition providing for full fuel flow. If this condition exists then the three way valve 27 is clearly not necessary.

As mentioned before rim pull limit at zero ground speed may be set relatively low by decreasing the forces on the bias spring side of piston 49 through adjustment of the bias spring compression by adjustment of the threaded member 59. In such a case, higher pitot pressures are required to move piston 49 to a position resulting in full fuel flow which means higher torque converter output speeds are necessary before the governor will allow full fuel flow to the engine. If the limiting pitot pressure in first gear is in the normal operating range of pitot pressures in the next higher gear, it can be seen that torque would be limited in the next higher gear even though the drive train components are not experiencing limiting torque in that gear. For example in the first embodiment operation is such that the same pitot pressure which would provide a limitation of 40,000 lbs rim pull at 4.25 miles per hour would appear in second gear at 7.8 miles per hour, limiting the rim pull available to a value of approximately 22,000 lbs, which is considerably less than that which can be experienced by the drive train components in second gear without detriment. Thus the performance in second gear would be degraded without achieving benefit. In such an instance the three way valve 27 is necessary in the system so that main clutch pressure is delivered to the spring package 29 when the operator selects a gear higher than first gear to provide the constant high speed governing condition.

Figure 5:
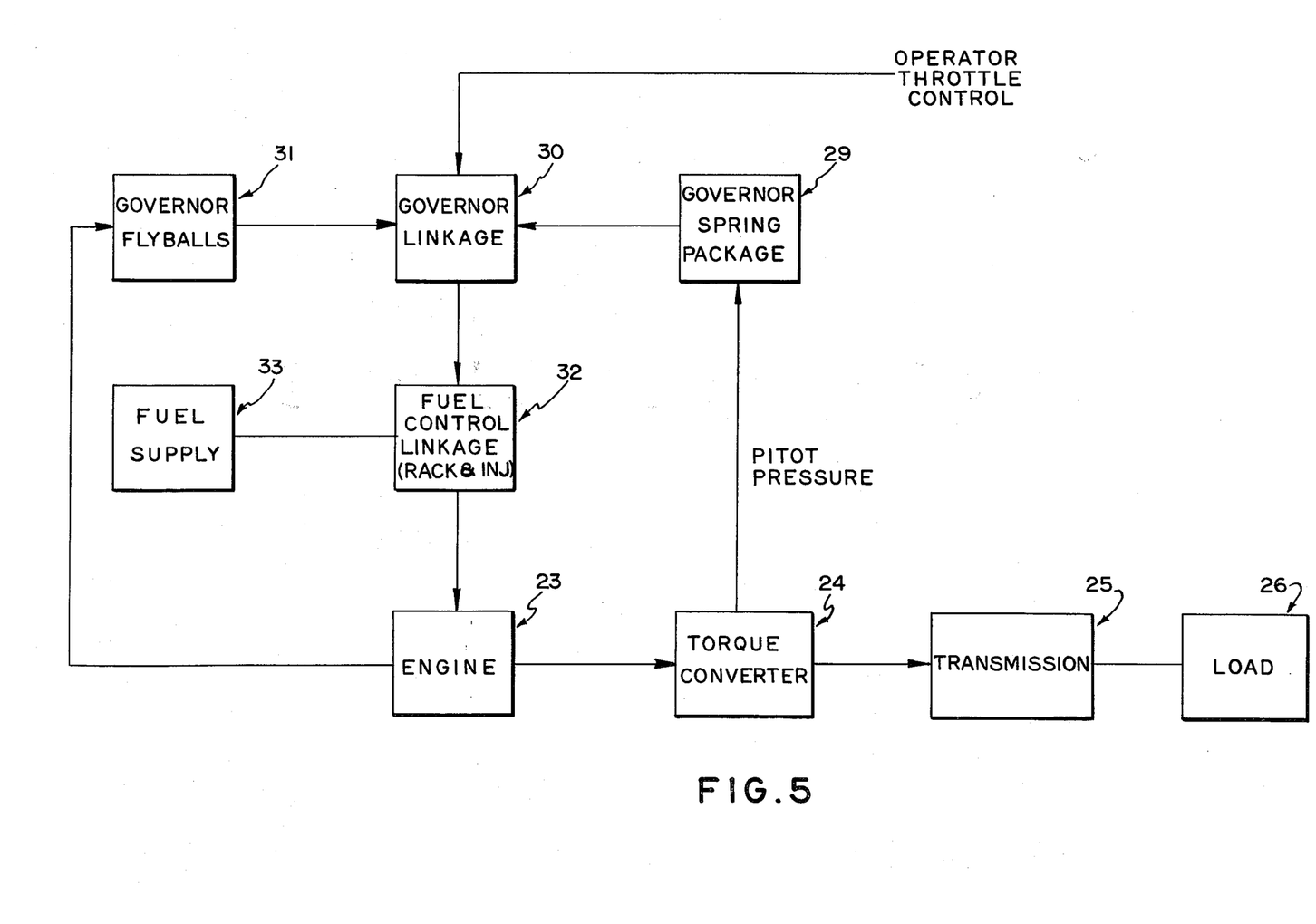
FIG. 5 is a block diagram showing the relationship between the major components in a system without separate switchover to normal governor operation.

On the other hand, if a high limiting value of rim pull is selected as acceptable at zero miles per hour, relatively low pitot pressures are required to move piston 49 to a position resulting in full fuel flow. In such a case pitot pressures are generated at or below the lowest torque converter output speeds in the normal operating range of any gear other than first which are sufficient to move piston 49 to a position resulting in full fuel flow. An embodiment comprising a system as shown in FIG. 5 is then adequate, as the variable speed range of the governor is only in operation in first gear from zero ground speed to the predetermined ground speed which is representative of limiting torque. The remainder of the system in FIG. 5 functions precisely as set forth in the description of the system represented by FIG. 2. FIG. 5 differs from FIG. 2 only in the omission of the three way valve 27, the omission of first gear and main clutch pressure lines thereto, and the routing of pitot pressure direct from the torque converter 24 to the governor spring package 29.

The system provided through utilizing the modified standard governor and the three-way valve for directing a variable pitot pressure proportional to vehicle speed to the governor when first gear is selected on the vehicle by the operator provides optimum performance from the vehicle while limiting drive train torque to a level which will not damage drive train components.

The rim pull-vehicle speed relationship may be shaped to some extent at the low end of the first gear speed range whereby if conditions require a reduction in available torque for reduction in speed a positive slope can be obtained in that portion of a curve, and if conditions require an increase in available torque for decrease in speed a negative slope can be obtained for that portion of a curve. The usual case will require a substantially constant rim pull as a function of vehicle speed until maximum engine speed is attained. In the event torque limitation is relatively high the three way valve may be omitted as pitot pressures which would allow the governor to function in the variable limit speed range are always exceeded in the normal operating ranges for all gear levels except first gear. The consideration relative to the insertion or omission of three way valve 27 is whether or not the governor will interfere with normal vehicle performance in gears other than first gear. It should be noted that the torque limiting feature could be fashioned to be operable in any intermediate gear range or ranges by the mere devices of bias spring selection and adjustment and provident use of the three way valve means.

We claim:

1. In apparatus for imparting momentum to a load, an internal combustion engine, a torque converter attached to said engine, drive train components including a transmission for selection of torque ratios to be delivered from said engine to said load, in combination with a torque limiting system comprising sensing means for providing a signal related to the torque converter output speed, a governor for limiting the speed of said engine, means actuated by the torque ratio selection for directing the torque converter output speed signal to the governor, said signal operating to modify the limit speed of said engine, whereby said governor limits engine speed to levels providing efficient operation and producing drive train torques which are within the stress limit capabilities of the drive train components.

2. In power operated apparatus for imparting momentum to a load through a drive train, an internal combustion engine, a governor for controlling the speed of said internal combustion engine, a torque converter coupled to said internal combustion engine, an output shaft on said torque converter for coupling to the load, first means in said governor for limiting said internal combustion engine to a predetermined engine speed, means for generating an output signal related to the speed of said torque converter output shaft, second means in said governor for receiving said output signal and for limiting said internal combustion engine to an engine speed corresponding to said output signal, said internal combustion engine thereby being limited by said governor at a speed which is a combination of said predetermined and variable engine speeds, whereby said internal combustion engine governed speed is modified by said output shaft speed for metering change in load momentum so that internal stress in the drive train is limited to a level below damaging stress.

3. A power operated apparatus as in claim 2 wherein said means for generating an output signal related to torque converter output shaft speed comprises means providing a variable pressure related to torque converter output speed, said second means for limiting being responsive to said variable pressure.

4. A power operated apparatus as in claim 3 wherein the drive train includes a transmission having a plurality of gear ratios, means for producing a relatively high pressure mounted on the apparatus, valve means connected to receive said variable pressure and said relatively high pressure, said valve means operating to direct said variable pressure to said second means in said governor when a predetermined gear ratio is selected at the transmission, so that the engine is governed at speeds related to said variable pressure until said variable pressure reaches a predetermined value, said combination speed being a constant when said variable pressure is above said predetermined value, said valve means further operating to exclusively direct said relatively high pressure to said second means in said governor in other gear ratios, so that said engine is governed at said constant combination speed.

5. A power operated apparatus as in claim 3 in which the drive train includes a transmission having a plurality of gear ratios, wherein said second means in said engine governor receives said variable pressure to govern the engine at speeds related to said variable pressure in a first gear until said variable pressure reaches a predetermined value, and thereafter said engine is governed at a constant speed in first gear and throughout the normal speed ranges of all other gears.

6. Power operated apparatus as in claim 3 wherein said first means for limiting in said governor is of the type having a governor housing, a compression spring in said housing, flyballs rotating at a speed proportional to engine speed, linkage between said flyballs and said compression spring, said linkage being urged by the flyballs toward a position limiting the fuel flow to the engine and being urged by the compression spring toward a position delimiting the fuel flow to the engine, and wherein said second means for limiting is in combination therewith, comprising a bias spring, a bias spring housing attached to one end of said governor housing, a movable piston for which said governor housing forms a cylinder, a seat on one side of said movable piston for said bias spring, a fixed seat for retaining the opposite end of said bias spring, a seat on the other side of said movable piston for said compression spring, and a port in said governor housing for admitting said variable pressure to the bias spring side of said piston.

7. Power operated apparatus as in claim 6 wherein said second means for limiting in said governor includes adjusting means extending through said bias spring housing for setting the position of said fixed seat for retaining said bias spring for the purpose of adjusting the compressed length of said bias spring.

8. Power operated means as in claim 2 together with pressure sensitive valve means operating to transmit said output signal to said second means for limiting, and means for biasing said second means for limiting to thereby set the engine limiting speed for zero output shaft speed.

9. A torque limiting system for use with equipment having an internal combustion engine coupled to drive train components through a torque converter for providing a plurality of torque ratio selections for accomplishing work upon a load, comprising a governor for limiting the speed of said engine to a predetermined speed, means for detecting the output speed of said torque converter and for providing a signal related thereto, means for modifying said governor operation to limit said engine speed to a level above said predetermined speed corresponding to said output signal, thereby providing a predetermined torque level to the drive train, means actuated by torque ratio selection for connecting said output speed signal to said means for modifying, whereby torque is maintained below levels which are damaging to said drive train components.

10. A torque limiting system as in claim 9 wherein said signal related to said output speed is a fluid pressure and said means actuated by torque ratio selection is a valve, and wherein said governor is of the type having a governor housing, a compression spring in said housing, flyballs rotating at a speed proportional to engine speed, linkage between said flyballs and said compression spring, said linkage being urged by the flyballs toward a position limiting the fuel flow to the engine, and being urged by the compression spring toward a position delimiting the fuel flow to the engine, and wherein said means for modifying includes a bias spring, a bias spring housing connected to said governor housing, a movable piston utilizing one end of said governor housing as a cylinder and urged toward said compression spring by said bias spring, a port in said governor housing on the bias spring side of said piston for receiving said fluid pressure from said valve, and adjusting means for setting the compression of said bias spring.

11. A torque limiting system as in claim 9 wherein said means actuated by torque ratio selection is a three way valve and wherein said signal related to output speed is a first pressure signal received by said three way valve, a constant high pressure source for providing a second pressure signal, means for delivering said second pressure signal to said three way valve, said three way valve operating to transmit said first pressure signal to said means for modifying said governor operation for at least one of said plurality of torque ratio selections, and to transmit said second pressure signal to said means for modifying said governor operation for all other torque ratio selections.

12. A torque limiting system for use with equipment having an internal combustion engine coupled to drive train components through a torque converter for providing a plurality of torque ratio selections for accomplishing work upon a load, comprising a governor for limiting the speed of said engine to a predetermined speed, a pitot pressure sensor located on the output side of said torque converter for detecting the output speed of said torque converter for providing a signal related thereto, a high pressure source, means actuated by torque ratio selection, a pressure line extending from said high pressure source to said means actuated by torque ratio selection, said last named means being for selectively connecting said output signal and said high pressure to said governor for predetermined torque ratio selections, said governor operation being modified thereby to control internal combustion engine speed to a value less than said predetermined speed, whereby engine speed is limited so that torque converter output speed will provide change in load momentum which results in acceptable drive train torques.

13. A method for limiting torque applied to drive train components associated with a load which is driven through a torque converter by an internal combustion engine having linkage providing control of engine fuel flow, comprising the steps of sensing torque converter output shaft speed in the range from zero to a predetermined value, producing an output pressure proportional to the torque converter output shaft speed, transmitting said proportional pressure to a first valve input, governing the engine to obtain an initial engine speed limit for zero torque converter output shaft speed, transmitting a constant high pressure to a second valve input, varying engine fuel flow responsive to said proportional pressure from the output of said valve to obtain a varying engine speed limit for torque converter output shaft speeds above zero speed and below said predetermined value, and controlling engine fuel flow responsive to said constant high pressure from the output of said valve to maintain a constant engine speed limit for torque converter output shaft speeds above said predetermined value whereby internal stress in the drive train components is limited and efficient load driving is obtained.

* * * * *